United States Patent
Kanuri et al.

(10) Patent No.: US 9,812,724 B2
(45) Date of Patent: Nov. 7, 2017

(54) PREVENTING MIGRATION OF LIQUID ELECTROLYTE OUT OF A FUEL CELL

(75) Inventors: Sridhar V. Kanuri, Milford, CT (US); Richard D Breault, North Kingstown, RI (US); Kishore Kumar Tenneti, Vernon, CT (US); Ned E. Cipollini, Enfield, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 396 days.

(21) Appl. No.: 13/142,099

(22) PCT Filed: Jun. 18, 2009

(86) PCT No.: PCT/US2009/003658
§ 371 (c)(1),
(2), (4) Date: Jun. 24, 2011

(87) PCT Pub. No.: WO2010/123479
PCT Pub. Date: Oct. 28, 2010

(65) Prior Publication Data
US 2012/0028160 A1    Feb. 2, 2012

Related U.S. Application Data

(60) Provisional application No. 61/214,130, filed on Apr. 20, 2009.

(51) Int. Cl.
*H01M 8/04* (2016.01)
*H01M 8/086* (2016.01)
(Continued)

(52) U.S. Cl.
CPC ......... *H01M 8/086* (2013.01); *H01M 8/0284* (2013.01); *H01M 8/0286* (2013.01); *H01M 8/0228* (2013.01); *Y02P 70/56* (2015.11)

(58) Field of Classification Search
CPC ............ H01M 8/04; H01M 8/24; H01M 2/08; H01M 8/0228; H01M 8/0284;
(Continued)

(56) References Cited

U.S. PATENT DOCUMENTS

| 4,728,533 A * | 3/1988 | Feigenbaum et al. ........ 429/508 |
| 5,536,598 A * | 7/1996 | LaFollette ..................... 429/210 |
| 2002/0012823 A1* | 1/2002 | Komiya .................. H01M 8/04 429/414 |

FOREIGN PATENT DOCUMENTS

JP           10289722 A  * 10/1998

OTHER PUBLICATIONS

Machine translation of JP application publication 10-289722 obtained Nov. 2016.*

\* cited by examiner

*Primary Examiner* — Nicholas P D'Aniello
*Assistant Examiner* — Ling R Zeng
(74) *Attorney, Agent, or Firm* — Carlson, Gaskey & Olds

(57) ABSTRACT

A stack (10) of fuel cells (11) is provided with barriers (32) to prevent migration of a liquid electrolyte (such as phosphoric acid) out of the cells (11). The barrier (32) is secured within a step (34) defined within a land region (28) of a separator plate assembly (18) and extends from an edge (30) of the separator plate assembly (18) all or a portion of a distance between the edge (30) and a flow channel (24) defined within the separator plate assembly (18). The barrier (32) also extends away from the edge (30) a distance of between 0.051 and 2.0 millimeters (2 and 80 mils). The barrier (32) includes a hydrophobic, polymeric film (36), a pressure sensitive adhesive (38), as an assembly aid, and a fluoroelastomer bonding agent (40).

34 Claims, 5 Drawing Sheets

(51) Int. Cl.
*H01M 8/0284* (2016.01)
*H01M 8/0286* (2016.01)
*H01M 8/0228* (2016.01)

(58) Field of Classification Search
CPC ..... H01M 8/0286; H01M 8/086; Y02E 60/50; Y02P 70/56
USPC ....... 429/455, 35, 36, 38, 39, 30, 33, 41, 44
See application file for complete search history.

PREVENTING MIGRATION OF LIQUID ELECTROLYTE OUT OF A FUEL CELL

CROSS REFERENCE TO RELATED APPLICATION

This application claims the benefit of U.S. provisional patent application Ser. No. 61/214,130 that was filed on Apr. 20, 2009 entitled "Fuel Cell With a Barrier to Acid Migration Out of the Fuel Cell".

TECHNICAL FIELD

The present disclosure relates to fuel cells that are suited for usage in transportation vehicles, portable power plants, or as stationary power plants, and the disclosure especially relates to a fuel cell including a barrier to migration of an acid electrolyte from the fuel cell into an adjacent fuel cell.

BACKGROUND ART

Fuel cells are well known and are commonly used to produce electrical current from hydrogen containing reducing fluid, fuel and oxygen containing oxidant reactant streams, to power various types of electrical apparatus. Many fuel cells use a liquid electrolyte such as phosphoric acid, and such fuel cells are typically adjacent other fuel cells to form a well known fuel cell stack having manifolds and associated plumbing to deliver and remove reactant and exhaust stream, etc.

Phosphoric acid electrolyte fuel cells are frequently associated with a problem of migration of acid out of one cell into an adjacent cell. Many efforts have been undertaken to resolve this problem. Such efforts are disclosed, for example, in commonly owned U.S. Pat. No. 5,079,104 to Roche et al., U.S. Pat. No. 5,156,929, to Dec et al., U.S. Pat. No. 5,178,968 to Roche, U.S. Pat. No. 5,270,132 to Breault et al., U.S. Pat. No. 5,837,395 to Breault et al., and U.S. Pat. No. 6,050,331 to Breault et al., which patents are hereby incorporated herein by reference thereto.

Such phosphoric acid fuel cells contain excess acid to accommodate acid loss due to evaporation into the reactant streams, loss due to absorption by cell components and loss by reaction with materials within the cell. This excess acid is stored in electrolyte reservoir plates which may be a separate component or the electrolyte storage function may be integrated into the porous electrode substrate. Managing the liquid electrolyte within a fuel cell is a significant design challenge.

The carbonaceous materials at the edges of planar components of the fuel cell that are exposed to the air inlet and air exit manifolds are oxidized due to chemical reaction. The extent of oxidation is a function of the electrochemical potential, the partial pressure of water vapor and the local temperature. Oxidation is normally greater at the air inlet edge of the cell due to higher temperatures than at the air exit edge of the cell. Oxidation typically is minimal on the edges exposed to the reactant fuel.

Oxidation of the carbonaceous material results in the material at the edge of the cell becoming wettable and leads to the presence of an acid film along the edge of the separator plate assembly. This acid film results in an ionic shunt current path along the edge of the fuel cell. This shunt current path results in protons (hydrogen ions) flowing from the positive end of a substack of cells to the negative end of the substack along the edges of the cells. A "substack" of fuel cells is a group of typically 4-8 cells disposed between cooling plates within the fuel cell stack. There are two consequences to these shunt currents. The first consequence is that the shunt current lowers the electrolyte potential such that carbon corrosion occurs at the positive end of the substack. Carbon corrosion is a significant issue for fuel cells operating at elevated reactant pressures where the electrode potentials are higher than at ambient pressure. The second consequence is that the shunt current results in the flow of anions (di-hydrogen phosphate) from the negative end of the substack to the positive end of the sub-stack. The hydrogen ions and the di-hydrogen phosphate ions combine at the positive end of the sub-stack. This results in acid being pumped from the negative end of the sub-stack to the positive end of the sub-stack along the edge of the stack. The consequences of this acid pumping is that the cells at the negative end will fail due to reactant cross-over due to the loss of acid; and the positive cell will fail due to poor performance due to the excess acid. Acid pumping from cell to cell significantly reduces the useful life of the fuel cell. The acid pumping problem is most severe in cells with small electrolyte reservoirs.

FIG. 1 presents a schematic representation of the above described acid pumping or acid migration between "Cell 1" and "Cell 2", wherein such cells would be two of many fuel cells in a fuel cell stack assembly 10. It is noted that an "integral separator plate", also referred to herein as a "separator plate assembly" 18 is located between the cathode electrode 12 of "Cell 1" and the anode electrode 14 of "cell 2". While the separator plate assembly defines reactant passage flow fields for both adjacent electrodes separated by an impermeable layer, FIG. 1 shows schematically how acid migrates as a film along an edge of the integral separator plate between "Cell 1" and "Cell 2".

SUMMARY

The disadvantages and limitations of the background art discussed above are overcome by the present disclosure. The disclosure includes a fuel cell for generating electrical current from hydrogen containing reducing fluid fuel and oxygen containing oxidant reactant streams. The fuel cell includes a cathode electrode and an anode electrode secured adjacent a liquid acid electrolyte. A separator plate assembly is secured adjacent both the cathode electrode of one cell and the anode electrode of an adjacent cell. The separator plate assembly defines a first flow field adjacent a first contact surface of the separator plate assembly which includes at least one flow channel defined between ribs of the separator plate assembly so that the at least one flow channel is defined below the first contact surface and so that the first contact surface contacts the adjacent electrode to direct one of the reactant streams adjacent the electrode. The separator plate assembly also includes land regions extending along the first contact surface on each side of each flow field to an edge of the separator plate assembly and extending about parallel to a direction of the flow channel.

A barrier to acid migration is secured within a step defined within the land region of the separator plate assembly and the barrier extends from the edge of the separator plate assembly all of or a portion of a distance between the edge and the flow channel. The barrier also extends away from the edge of the separator plate assembly a distance of between about 0.051 and about 2.0 millimeters (about 2 and about 80 mils; a mil is 0.001 inch). The barrier includes a hydrophobic film, a pressure sensitive adhesive (a manufacturing aid) and a bonding agent.

The disclosure includes a method of and apparatus for prohibiting acid migration from a fuel cell, using a barrier to acid migration, described in more detail below and within the attached Figures.

DESCRIPTION OF THE PREFERRED EMBODIMENTS

Figure 1:
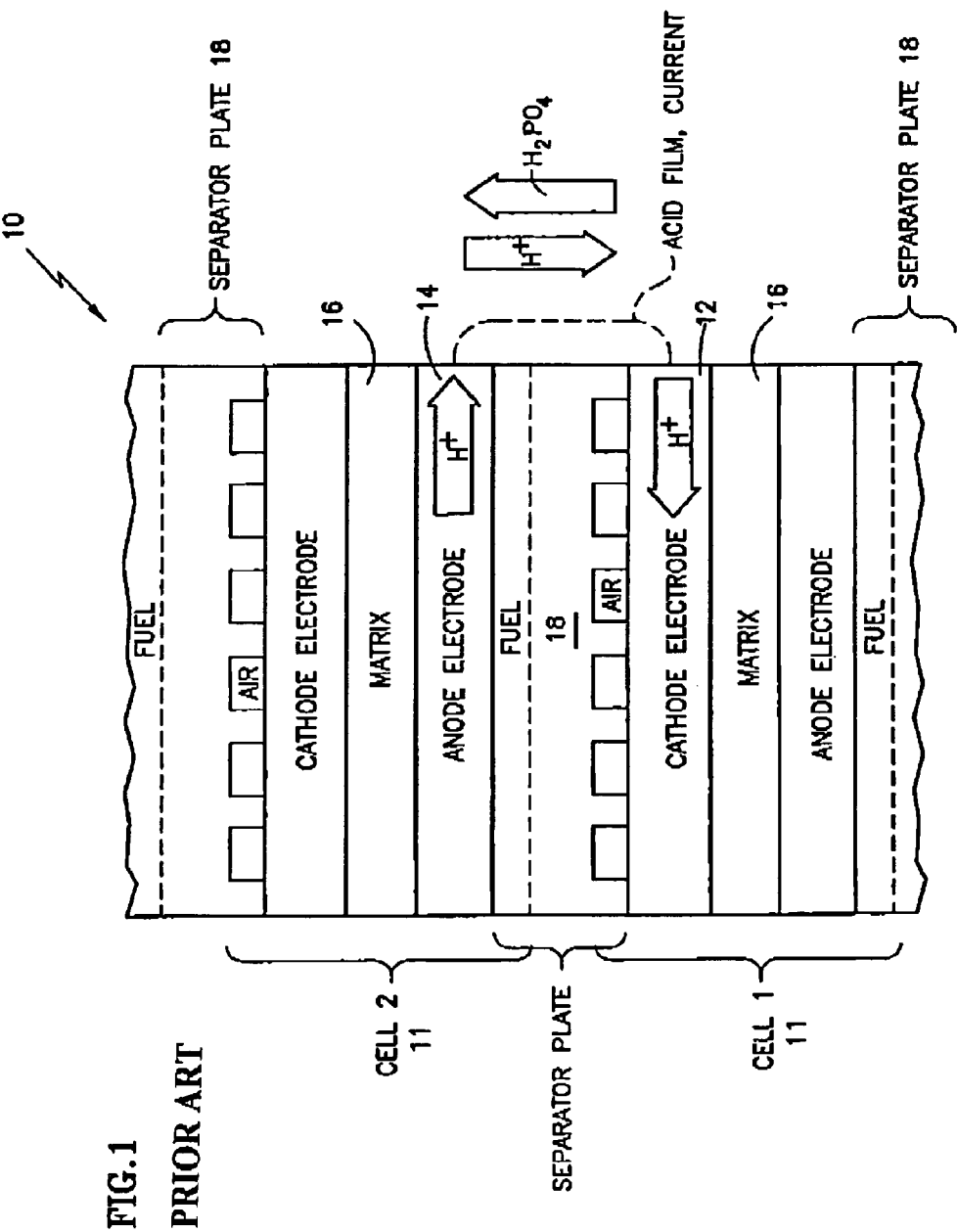
FIG. 1 is a simplified schematic representation of a "Cell 1" and a "Cell 2" showing components of the cells and development of acid migration from "Cell 1" to "Cell 2" and a shunt current associated therewith.
Figure 2:
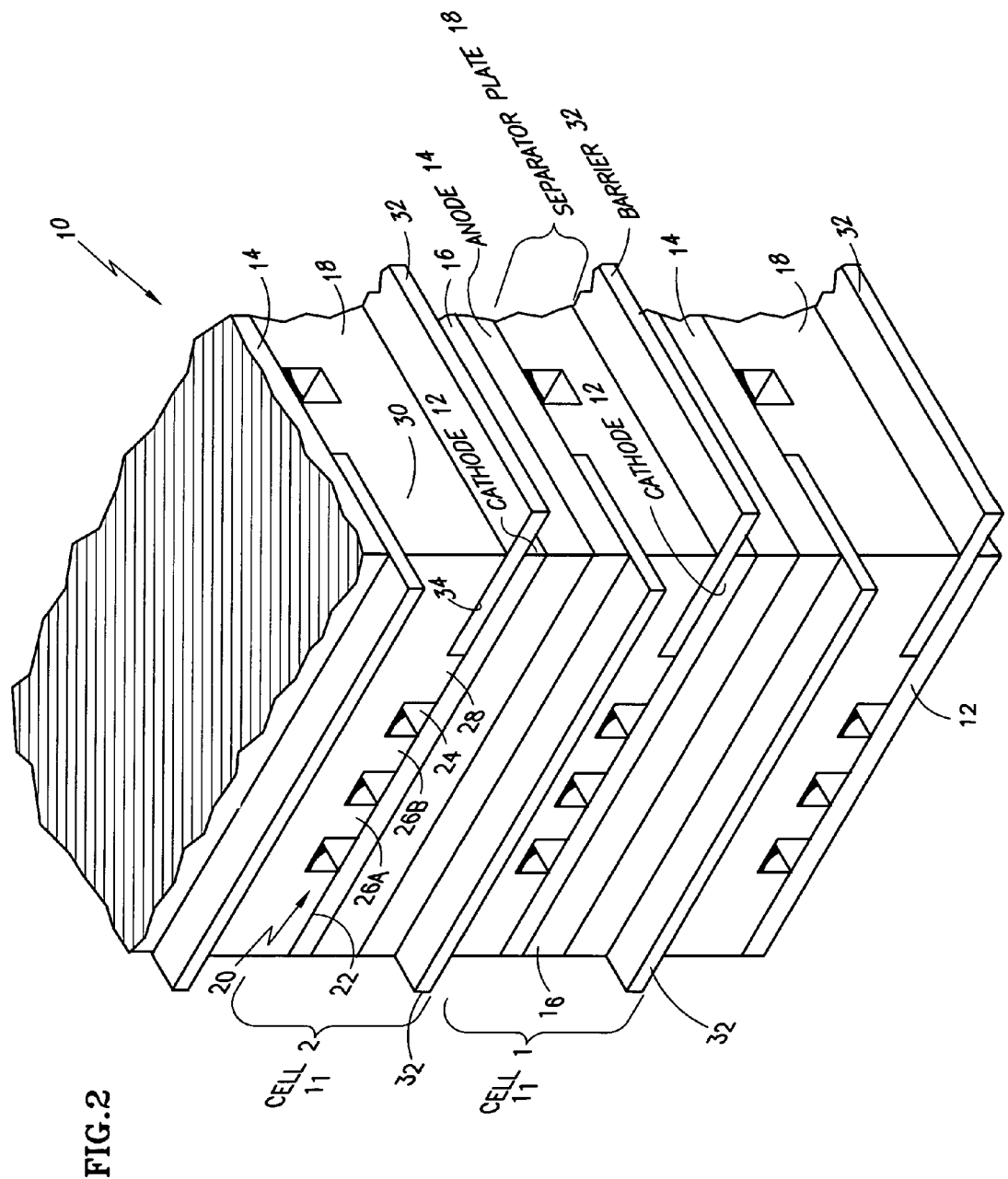
FIG. 2 is a fragmentary, simplified perspective view of a fuel cell having a barrier to acid migration out of the fuel cell constructed in accordance with the present disclosure.

Referring to the drawings in detail, portions of a stack 10 of fuel cells 11 with barriers to acid migration out of the fuel cells are shown in FIG. 2. It is noted that the simplified schematic of FIG. 2 includes a cathode electrode 12 of a first fuel cell 11 ("Cell 1" of FIG. 1) and an anode electrode 14 of an adjoining second cell 11 ("Cell 2" of FIG. 1). As shown in FIG. 1, each fuel cell also includes a matrix 16 containing a liquid acid electrolyte, such as phosphoric acid or fluoroborate acid.

A separator plate assembly 18 is secured between the cathode electrode 12 of one cell (e.g., Cell 1) and the anode electrode 14 of an adjacent cell (e.g., cell 2). The separator plate assemblies 18 may be made according to the disclosure of a "Fuel Cell Separator Plate Assembly" disclosed in Patent Application Publication No. US 2008/0057373 A1, published on Mar. 6, 2008, or may take the form of a ribbed type of separator plate shown in FIG. 1 of U.S. Pat. No. 4,734,906. Each separator plate assembly 18 defines a first flow field 20, such as a cathode flow field, adjacent a first contact surface 22 of the separator plate assembly 18. The first flow field 20 includes at least one flow channel 24 defined between ribs 26A, 26B of the separator plate assembly 18 so that the at least one flow channel 24 extends inwardly from the first contact surface 22 and so that the first contact surface 22 contacts the adjacent cathode electrode 12 to direct an oxidant reactant stream adjacent the cathode electrode 12.

Figure 3:
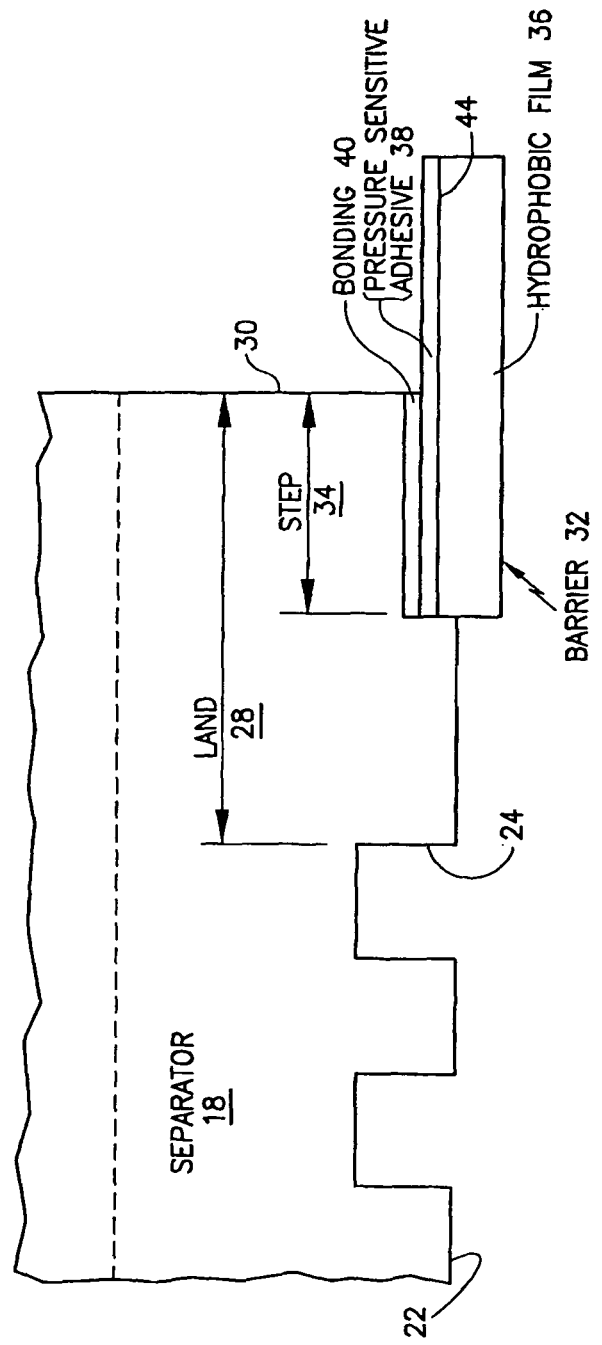
FIG. 3 is a simplified, fragmentary, schematic representation of the barrier to acid migration of FIG. 2, in accordance with the present disclosure.

The separator plate assembly 18 comprises a land region 28 shown in FIGS. 2 and 3 extending along the first contact surface 22 between an edge 30 of the separator plate assembly 18 and the adjacent flow channel 24 and extending parallel to the flow channels 24. An acid migration barrier 32 is secured within a step 34 defined within the land region 28 of the separator plate assembly 18. The barrier extends from the edge 30 of the separator plate assembly 28 all or a portion of the distance between the edge 30 and the adjacent flow channel 24. The barrier also extends away from the edge of the separator plate assembly a distance of between about 0.051 mm and about 2.0 mm (about 2 mils and about 80 mils). The barrier includes a hydrophobic film 36, a pressure sensitive adhesive 38 and a bonding agent 40. In a preferred embodiment, the hydrophobic film 36 is defined as a polymeric film which has a contact angle of greater than 90° with a liquid electrolyte at cell operating temperature and acid concentration, which has a melting point at least 50° C. (90° F.) above the cell operating temperature, and is chemically stable for 10 years in the environment of the fuel cell stack 10. Suitable barrier film materials include polytetrafluoroethylene (PTFE), fluorinated ethylene propylene (FEP), and polyfluoroaloxy co-polymer resin (PFA).

The hydrophobic film 36 is equal to or greater than 2 mils (0.05 mm) thick and preferably between 2 mills (0.05 mm) and 5 mils (0.13 mm) thick. Below 2 mils it is too difficult to handle and above 5 mils there are cost and structural issues.

The pressure sensitive adhesive 38 (PSA) may be an acrylic or silicone adhesive and is about 0.025 mm (about 1 mil) thick. The pressure sensitive adhesive 38 is simply an assembly aide. The hydrophobic film preferably has one surface 44 coated with the PSA.

The bonding agent 40 may be an elastomer that is compatible in the fuel cell stack 10 and is preferably a fluoroelastomer. Suitable fluoroelastomers include FLUO-REL®, VITON®, and FLUOROLAST®. The fluorine content of the fluoroelastomer bonding 40 must be 68% or greater to have acceptable corrosion resistance in a phosphoric acid fuel cell (PAFC). The preferred thickness of the fluoroelastomer is between 0.5 and 2.0 mils (0.0127-0.051 mm). Below 0.5 mils the bond is inadequate and above 2.0 mil there is a problem with extrusion of the elastomer bonding 40 during the initial heat-up of the stack. The elastomer bonding 40 may be applied to the hydrophobic film 36, to the PSA 38 or to the surface of the step 34 in the land 28.

For optimal results, the elastomer bonding 40 must be cured while the hydrophobic film 36 is compressed against the land region 28 to obtain a good acid barrier 32. The fuel cell stack 10 needs to be heated to above 175° C. for an hour to cure the fluoroelastomer bonding 40. This can be done in-situ within the fuel cell stack 10 during the first heat-up cycle of the stack 10. The axial force in the land region 28 of the fuel cell is generally in excess of 345 kPa (50 psi), which is more than adequate to create a good seal. Alternatively, any of the techniques show in DuPont Technical Bulletin H-55005-2 dated 12/96, such as hot bar heat sealing, may be used to create a bond during the manufacturing process and prior to cell assembly.

The geometry of the barrier to acid transfer is dictated by manufacturing tolerances and axial load considerations within the cell stack. If the seal land 28 is too thick there will be too little pressure within the active area and this will result in increased cell resistance and reactant cross-over due to inadequate compression of the matrix. If the seal land 28 is too thin there will be inadequate compression on the edge seals and reactant leakage will occur. The easiest configuration to manufacture is one where the width of the step 34 is equal to the width of the land 28. Designs may also have the width of the seal step 34 less than that of the land 28. The depth of the step 34 relative to the height of the ribs 22 should preferably be about equal to (80% to 120% of) the thickness of the hydrophobic film. This combination results in the edge area being slightly thicker than the active area which has proven to be acceptable. Alternatively, barriers may be bonded to lands, with no step if appropriate in a given case. It should be understood that any step 34 need only be defined along edges of the separator plate assemblies 18 to which barriers 32 will be bonded.

Barriers 32 may be secured at an edge 30 through which fuel enters or leaves the separator plate assembly, adjacent an anode 14, or at an edge where oxidant enters or leaves the separator plate assembly, such as in the flow channel 24. Additionally, the barriers 32 may be adjacent reactant inlets or outlets or both.

Care should be taken so that barriers do not interfere with the reactant manifold seals (not shown). Herein, the word "about" is to mean plus or minus 20%.

Figure 4:
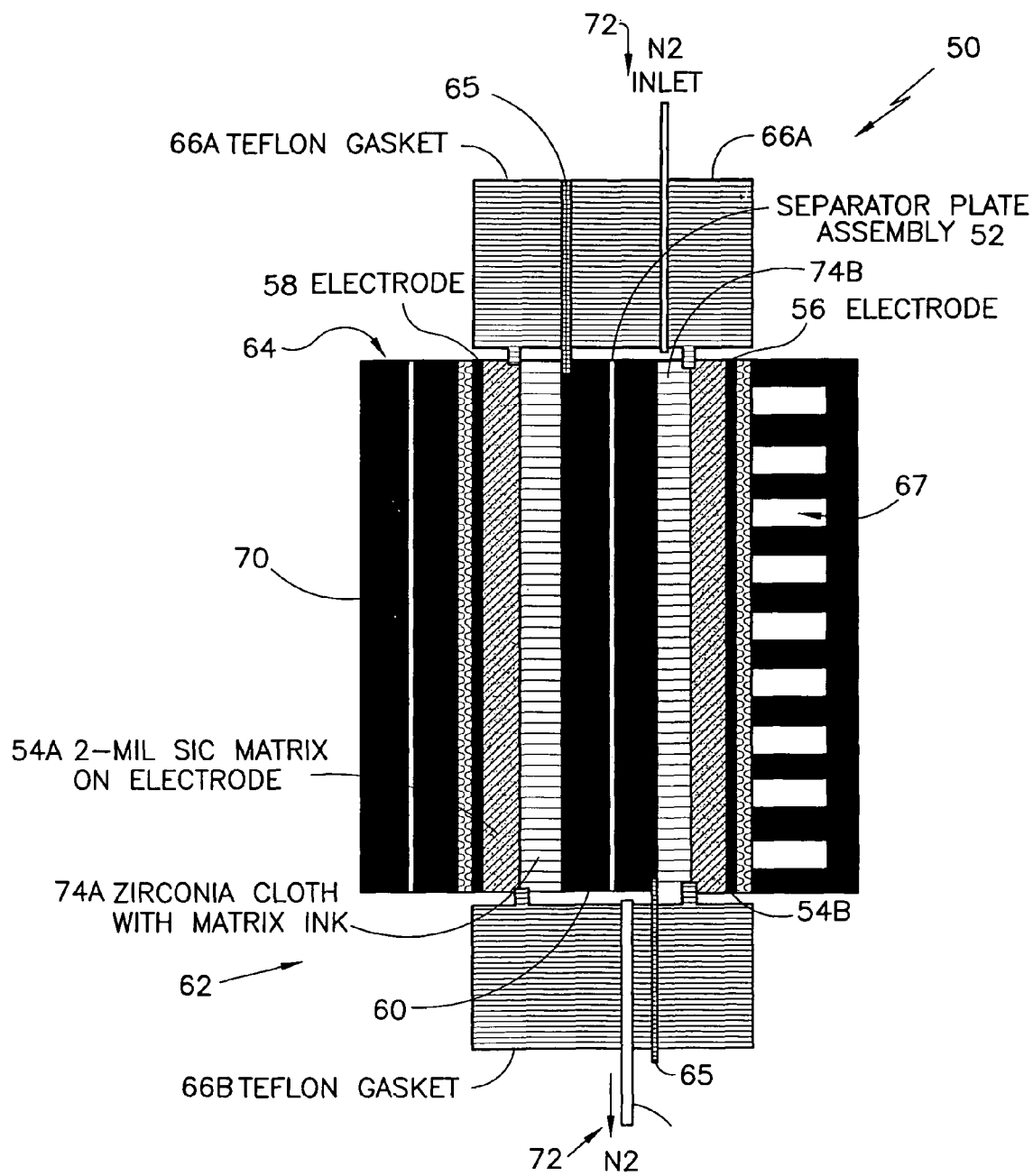
FIG. 4 is a simplified schematic representation of a sub-scale shunt current rig for permitting rapid evaluation of configurations and materials for preventing acid transfer at edges of fuel cell components.

FIG. 4 shows a simplified schematic representation of a sub-scale shunt current rig 50 developed by the inventors herein for permitting relatively rapid evaluation of configurations and materials for preventing acid transfer at edges of fuel cell 11 components. The sub-scale shunt current rig includes a separator plate assembly 52 sandwiched between phosphoric acid filled matrices 54A, 54B. The acid filled matrices 54A, 54B and additional acid filled matrices 74A, 74B prevent electronic shorts and gas cross-over between electrode 56 and electrode 58. The objective of the rig 50 is to measure ionic resistance of any electrolyte path on edges 60 of the separator plate assembly 52. This is done by placing hydrogen gas on both the electrode 56 and electrode 58 and using a direct current ("DC") power supply to operate the cell 62 including the electrodes 56, 58 and matrices 54A, 54B, 74A, 74B as a hydrogen pump. Current passing through the cell 62 is an ionic shunt current and is measured as a function of a voltage drop across the cell 62. The cell voltage divided by the current is the ionic resistance of the shunt current path. One skilled in the art can convert the ionic resistance to an acid pumping rate for a particular electrolyte, cell design and operating conditions.

The separator plate assembly 52 is aged at an elevated potential and temperature by placing hydrogen on the electrode 58 and nitrogen on the electrode 56 of the separator plate assembly 52. A potentiostat (not shown) is used to set a potential of the separator plate assembly 52 relative to the electrode 58 potential (hydrogen reference electrode). The standard aging condition is 175° C., a water dew point of 54° C. and a potential of 0.875V. This aging condition represents an acceleration factor of about 270× for an air inlet edge (not shown) of a phosphoric acid fuel cell (not shown) that operates at about 0.650 volts at 165° C. Therefore one hour of aging in the sub-scale shunt current rig 50 is equivalent to 270 hours at the air inlet in the cell stack 10 at rated power. This aging condition represents an acceleration factor of about 1140× for an air exit edge (not shown) of the fuel cell that operates at 0.650 volts at 140° C. Therefore one hour of aging in the rig 50 is equivalent to 1140 hours at the air exit in the cell stack 10 at rated power. The sub-scale shunt current rig 50 includes other components to facilitate its operation including: a first reactant flow field 64 and a second reactant flow field 67 with inlet and exit passages (not shown) for directing flow of the hydrogen, nitrogen and air through the cell 62; gold wire 65 connected to the separator plate assembly 52; TEFLON® gaskets 66A, 66B for sealing the cell 62; passageways 72 for directing flow of nitrogen around edges of the separator plate assembly 52; a laminated electrolyte reservoir plate ("LERP") reactant flow field 70 with inlet and exit passages (not shown) and, zirconia cloth layers 74A, 74B with a matrix ink secured adjacent opposed surfaces of the separator plate assembly 52B.

Figure 5:
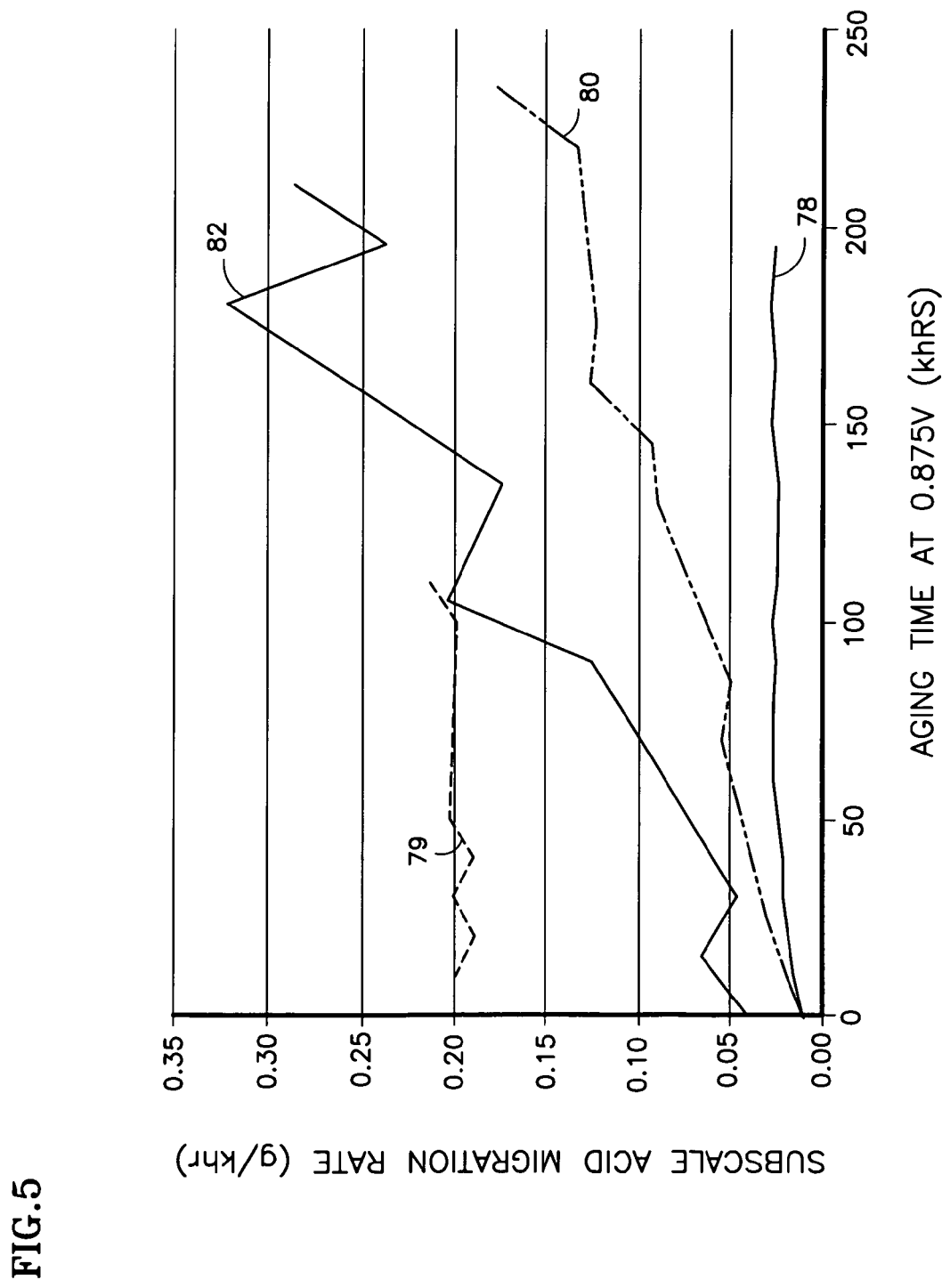
FIG. 5 is a graph showing "acid migration rate . . . " as a function of "aging time" for a separator plate assembly within the FIG. 4 sub-scale shunt current rig.

FIG. 5 shows an acid pumping or "subscale acid migration rate . . . " as a function of aging time for a separator plate assembly 52 with bare edges 60. The untreated edges 60 start out with a high acid transfer rate that stays high with increasing time as shown at reference numeral 79 in FIG. 5. Tests were also run to establish if curing the bonding agent elastomer 40 prior to assembly of the cell 62 was detrimental. Two exemplary separator plate assemblies were made with 0.127 mm (5 mil) thick PTFE film, that extended approximately 0.762 mm (30 mils) beyond the edge 60, with the PTFE film containing an acrylic PSA, and with about 0.019 mm (0.75 mils) of FLUOROLAST® painted on the land region of the separator plate assembly. The FLUOROLAST® in one assembly was cured at 190° C. for two hours without any compression. The other assembly was cured within the shunt current rig at 190° C. for two hours under a compressive load of about 100 psi. Sub-scale shunt current testing was done with both assemblies and is also shown in FIG. 5. The assembly that was cured under pressure has a low acid transfer rate as shown at reference numeral 78 in FIG. 5. The assembly that was cured without any compression has a higher transfer rate as shown by reference numeral 82.

Another separator plate assembly was made with 0.127 mm (5 mil) thick PTFE film, that extended approximately 0.127 mm (5 mils) beyond the edge, that contained an acrylic PSA, with about 0.019 mm (0.75 mils) of FLUOROLAST® painted on the seal region. This assembly was cured within the shunt current rig at 190° C. for two hours under a compressive load of about 100 psi. Sub-scale shunt current testing was done. The assembly where the PTFE film extended 0.127 mm (5 mils) beyond the edge, as represented by reference numeral 80 in FIG. 5, had a significantly higher acid transfer rate than the assembly where the PTFE extended 0.75 mm (30 mils) 78 as shown in FIG. 5.

The invention claimed is:

1. A stack of fuel cells for generating electrical current from streams of hydrogen-containing reducing fluid and oxygen-containing oxidant reactant, comprising:
   a plurality of cathode electrodes;
   a plurality of anode electrodes;
   a plurality of matrix plates holding a liquid acid electrolyte, each matrix plate being between one of the cathode electrodes and one of the anode electrodes;
   a plurality of separator plate assemblies, each separator plate assembly having a separator plate secured in contact with and between one of the cathode electrodes and one of the anode electrodes, each separator plate defining a first flow field adjacent a first contact surface of the separator plate, the first flow field including at least one first flow channel extending inwardly from the first contact surface of the separator plate, the first flow channel being configured to direct a corresponding one of the streams adjacent a selected one of the electrodes, each separator plate having outside edges that are perpendicular to the first contact surface, the outside edges of the separator plates being aligned with outside edges of the cathode electrodes and outside edges of the anode electrodes, each separator plate comprising a land region extending along the first contact surface between the at least one first flow channel and an adjacent one of the edges of the separator plate, the land region extending parallel to the at least one flow channel; and
   an acid migration barrier to inhibit acid migration, the barrier comprising a film that is distinct from the material of the separator plate, the barrier being secured to the land region of the separator plate and extending away from and outwardly beyond the adjacent one of the outside edges of the separator plate and the outside edge of an adjacent one of the electrodes in a direction away from the at least one first flow channel,
wherein each matrix plate is between the one of the cathode electrodes and the one of the anode electrodes without any acid migration barrier between the matrix plate and said electrodes.

2. A stack of fuel cells according to claim 1, wherein the barrier extends away from the adjacent one of the outside edges between about 0.051 mm and about 2.0 mm (about 2 mils and about 80 mils).

3. A stack of fuel cells according to claim 1, wherein the barrier has a thickness between about 0.051 mm and about 0.127 mm (about 2 and 5 mils).

4. A stack of fuel cells according to claim 1, wherein the barrier is a hydrophobic polymer film.

5. A stack of fuel cells according to claim 4, wherein the barrier comprises at least one of polytetrafluroethylene, fluorinated ethylene propylene and polyfluoroaloxy co-polymer resin.

6. A stack of fuel cells according to claim 1, wherein
a step is defined within the land region; and
the barrier is secured to the step.

7. A stack of fuel cells according to claim 6, wherein a depth of the step inwardly of the first contact surface is about equal to a thickness of the barrier.

8. A stack of fuel cells according to claim 6, wherein the step and the barrier extend all of the distance of the land region between the adjacent one of the edges and the at least one flow channel.

9. A stack of fuel cells according to claim 6, wherein the step and the barrier extend only a portion of a distance between the adjacent one of the edges and the at least one flow channel.

10. A stack of fuel cells according to claim 1, wherein the land region is flush with the contact surface.

11. A stack of fuel cells according to claim 1, wherein the land region is recessed beneath the contact surface.

12. A stack of fuel cells according to claim 1, wherein the film of the barrier is bonded to the land region.

13. A stack of fuel cells according to claim 12, comprising a fluoroelastomer bonding the film to the land region.

14. A stack of fuel cells according to claim 13, wherein the fluoroelastomer has a fluorine content greater than about 68% by weight.

15. A stack of fuel cells according to claim 1, wherein
the barrier has a first thickness;
the adjacent one of the edges has a second thickness; and
the second thickness is greater than the first thickness.

16. A stack of fuel cells according to claim 1, comprising a plurality of the barriers and wherein the plurality of barriers are secured only to land regions adjacent ones of said flow channels which direct the oxygen-containing oxidant reactant.

17. A stack of fuel cells according to claim 1, comprising a plurality of the barriers and wherein the plurality of barriers are secured only to land regions adjacent ones of said flow channels which direct the hydrogen-containing reducing fluid.

18. A stack of fuel cells according to claim 1, wherein the plurality of barriers are secured only in land regions adjacent edges of said separator plates through which the oxygen-containing oxidant reactant enters the at least one flow channel.

19. A stack of fuel cells according to claim 1, comprising a plurality of barriers and wherein the plurality of barriers are secured to land regions adjacent edges of said separator plates through which the oxygen-containing oxidant reactant enters the at least one flow channel, and to land regions adjacent edges of said separator plates through which the oxygen-containing oxidant reactant exits the at least one flow channel.

20. A stack of fuel cells according to claim 1 wherein
each separator plate comprises a second flow field adjacent a second contact surface opposite from said first contact surface and adjacent one of said electrodes other than the selected electrode, the second flow field including at least one second flow channel extending inwardly from the second contact surface;
a second land region extending along the second contact surface between the at least one second flow channel and a second adjacent one of the edges of the separator plate, and extending parallel to the at least one second flow channel; and
a second barrier to acid migration, the second barrier comprising a second film that is distinct from the separator plate, the second film being secured to the second land region of the separator plate and extending away and outwardly from the second adjacent one of the edges of the separator plate in a direction away from the second flow channel.

21. A stack of fuel cells according to claim 1, wherein the outside edges of the electrodes and the outside edges of the separator plates are generally coplanar.

22. A method comprising:
prohibiting migration of a liquid acid electrolyte between a plurality of fuel cells in a stack using a plurality of acid migration barriers to inhibit acid migration, the fuel cells including a cathode electrode and an anode electrode secured adjacent opposed planar surfaces of a matrix for holding some of the liquid acid electrolyte, the stack including a plurality of separator plate assemblies respectively secured in contact with the cathode electrode of one of the cells and the anode electrode of an adjacent cell, the separator plate assemblies respectively defining a first flow field adjacent a first contact surface of the separator plate assembly, the first flow field including at least one flow channel extending inwardly from the first contact surface to direct a reactant stream adjacent a selected one of the electrodes, a land region extending along the first contact surface between the at least one flow channel and an adjacent edge of the separator plate assembly, the land region extending parallel to the at least one flow channel;
the acid migration barriers respectively being secured partially against the land region and partially extending away from and outwardly beyond the adjacent edge of the separator plate assembly and a laterally outside edge of an adjacent one of the electrodes
there is no acid migration barrier between any one of the matrix plates and the cathode electrode secured adjacent the planar surface of the matrix; and
there is no acid migration barrier between any one of the matrix plates and the anode secured adjacent the planar surface of the matrix.

23. A method according to claim 22, wherein the barriers respectively extend away from the adjacent edge of the separator plate between about 0.127 mm and about 2.0 mm (about 2 mils and about 80 mils).

24. A method according to claim 22, wherein the barriers respectively comprise a film that is between about 0.051 mm and 0.127 mm (about 2 mils and about 5 mils).

25. A method according to claim 22, wherein
a step within the land region extends from the adjacent edge all or a portion of a distance between the adjacent edge and the flow channel; and
the barriers are respectively secured partially within the step.

26. A method according to claim 25, wherein the step has a depth that is about equal to a thickness of the barrier.

27. A method according to claim 22, wherein each barrier comprises a hydrophobic polymer film distinct from a material of the separator plate.

28. A method according to claim 27, wherein said polymer film is selected from polytetrafluroethylene, fluorinated ethylene propylene and polyfluoroaloxy copolymer resin.

29. A method according to claim 22, wherein the barrier is bonded to a step within the land region.

30. A method according to claim 29, wherein the barrier is bonded to the step with a fluoroelastomer.

31. A method according to claim 30, wherein the fluoroelastomer has a fluorine content greater than about 68% by weight.

32. A method according to claim 22, wherein
each separator plate assembly defines a second flow field adjacent a second contact surface opposite from said first contact surface, the second flow field including at least one second flow channel extending inwardly from the second contact surface to direct another one of the reactant streams adjacent one of said electrodes other than the selected electrode;
a second step within a second land region extends from a second adjacent edge all or a portion of a distance between the second adjacent edge and the second flow channel; and
respective ones of the barriers to acid migration are secured within the second step and extend away from and outward of the second adjacent edge of the separator plate assembly in a direction away from the second flow channel.

33. A method according to claim 22, wherein said liquid acid electrolyte is selected from phosphoric acid and fluoroborate acid.

34. A stack of fuel cells according to claim 1, wherein said matrices contain a liquid acid electrolyte selected from phosphoric acid and fluoroborate acid.

* * * * *